United States Patent
Sasabuchi et al.

(10) Patent No.: US 8,917,321 B1
(45) Date of Patent: Dec. 23, 2014

(54) FAILURE-DETERMINATION APPARATUS

(71) Applicant: Honda Motor Co., Ltd., Minato-Ku, Tokyo (JP)

(72) Inventors: Yoji Sasabuchi, Haga-Gun (JP); Hiroyuki Koike, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/362,511

(22) PCT Filed: Jul. 8, 2013

(86) PCT No.: PCT/JP2013/068618
§ 371 (c)(1),
(2), (4) Date: Jun. 3, 2014

(87) PCT Pub. No.: WO2014/010546
PCT Pub. Date: Jan. 16, 2014

(30) Foreign Application Priority Data

Jul. 10, 2012 (JP) ................................. 2012-154963

(51) Int. Cl.
| | | |
|---|---|---|
| H04N 7/18 | (2006.01) |
| G08G 1/16 | (2006.01) |
| G01S 3/02 | (2006.01) |
| B60Q 9/00 | (2006.01) |
| B60Q 1/00 | (2006.01) |
| H04N 17/00 | (2006.01) |
| H04N 5/225 | (2006.01) |
| G06K 9/00 | (2006.01) |
| G01S 13/86 | (2006.01) |

(52) U.S. Cl.
CPC ........... *H04N 17/002* (2013.01); *H04N 5/2256* (2013.01); *G06K 9/00523* (2013.01); *G01S 13/867* (2013.01)

USPC ........... 348/119; 340/436; 340/901; 342/455; 701/45; 701/301

(58) Field of Classification Search
USPC .......... 348/118, 119, 148; 382/104, 106, 107; 340/435, 436, 438, 901–905; 701/45, 701/93, 96, 97, 301; 342/29, 41, 455
See application file for complete search history.

(56) References Cited

U.S. PATENT DOCUMENTS

| 6,035,053 A | * | 3/2000 | Yoshioka et al. | ............. 382/104 |
| 2005/0083432 A1 | * | 4/2005 | Honda et al. | ................... 348/362 |

(Continued)

FOREIGN PATENT DOCUMENTS

| JP | 2003-252147 A | 9/2003 |
| JP | 2005-157765 A | 6/2005 |

(Continued)

OTHER PUBLICATIONS

International Search Report issued in International Application No. PCT/JP2013/068618 with a mailing date of Oct. 8, 2013.

*Primary Examiner* — Victor Kostak
(74) *Attorney, Agent, or Firm* — Carrier Blackman & Associates, P.C.; Joseph P. Carrier; William D. Blackman

(57) ABSTRACT

A failure-determination apparatus is provided with: a radar device (2); a camera unit (3); a moving target determination unit (12) that determines whether or not the object detected by the radar device (2) is a moving target; an object extraction unit (13) that extracts a specific object from the image captured by the camera unit (3); and a failure-determination unit (14) that determines that the camera unit (3) is in an abnormal state when the object which has been determined to be the moving target by the moving target determination device (12), cannot be determined to be the specific object by the object extraction unit (13).

3 Claims, 6 Drawing Sheets

(56) References Cited

U.S. PATENT DOCUMENTS

| | | | |
|---|---|---|---|
| 2007/0005245 A1* | 1/2007 | Ellis | 701/213 |
| 2010/0201509 A1* | 8/2010 | Hara et al. | 340/435 |
| 2010/0253492 A1* | 10/2010 | Seder et al. | 340/435 |
| 2011/0184617 A1* | 7/2011 | Hegemann et al. | 701/70 |
| 2012/0035846 A1* | 2/2012 | Sakamoto et al. | 701/301 |
| 2013/0278441 A1* | 10/2013 | Rubin et al. | 340/905 |

FOREIGN PATENT DOCUMENTS

| | | |
|---|---|---|
| JP | 2006-292621 A | 10/2006 |
| JP | 2007-163258 A | 6/2007 |
| JP | 2009-029367 A | 2/2009 |

* cited by examiner

FAILURE-DETERMINATION APPARATUS

TECHNICAL FIELD

The present invention relates to a failure-determination apparatus that, in an object recognition apparatus provided with a transmitting and receiving device and an image capturing device, determines the presence/absence of an abnormality in the image capturing device.

Priority is claimed on Japanese Patent Application No. 2012-154963, filed Jul. 10, 2012, the contents of which are incorporated herein by reference.

BACKGROUND ART

As an object recognition apparatus that recognizes an object such as a pedestrian and a vehicle in the surroundings of a vehicle, for example, in the vehicle front side in the traveling direction, there is an apparatus that uses both a radar device (transmitting and receiving device) and a camera (image capturing device), and utilizes the detection results of both to determine the presence and type of an object.

For example, Patent Document 1 discloses a technique for determining whether or not an object is a pedestrian. In this technique the transmission output of a radar device is switched to high and low, and an object other than a vehicle is extracted by removing from detection results based on reflected waves received when the transmission output is high, detection results based on reflected waves received when the transmission output is low, and a pattern matching process is then performed on the extracted object, based on an image captured by a camera.

Document of Related Art

Patent Documents

[Patent Document 1] Japanese Unexamined Patent Application, First Publication No. 2005-157765

SUMMARY OF INVENTION

Problems to be Solved by the Invention

However, Patent Document 1 makes no disclosure in relation to failure in the radar device or the camera.

In a case where an object is to be recognized based on two detection results from a radar device and a camera as in the above object recognition apparatus, even if an abnormality occurs in only one of the radar device and the camera, object recognition position is influenced. Furthermore, various controls that may be performed by the vehicle in relation to an object recognized by the object recognition apparatus (controls such as attention drawing control and contact avoidance control) are also influenced.

Therefore, if an abnormality occurs in the camera, the user needs to be notified of the abnormality immediately.

Consequently, an embodiment of the present invention is to provide a failure-determination apparatus that is capable of making early determination of an abnormality in an image capturing device.

Means for Solving the Problem

The present invention employs the following measures in order to solve the above problems.
(1) A failure-determination apparatus of an aspect according to the present invention comprises: a transmitting and receiving device that transmits an electromagnetic wave toward a predetermined region in the surroundings of a vehicle, and that receives a reflected wave caused by the electromagnetic wave reflected from an object in the surroundings of the vehicle; an image capturing device that captures an image of the predetermined region in the surroundings of the vehicle; a moving target determination device that determines whether or not the object detected by the transmitting and receiving device is a moving target; an object extraction device that extracts a specific object from the image captured by the image capturing device; and a failure-determination device that determines that the image capturing device is in an abnormal state when the object which has been determined to be the moving target by the moving target determination device, cannot be determined to be the specific object by the object extraction device.
(2) In the aspect of (1) above, the lower the moving speed of the object, which has been determined as being the moving target by the moving target determination device, the less likely it may be that the image capturing device will be determined as being in the abnormal state.
(3) In the aspect of either one of (1) and (2) above, the lower the reflection level of the reflected wave, which has been reflected from the object determined as being the moving target by the moving target determination device, the less likely it may be that the image capturing device will be determined as being in the abnormal state.
(4) In the aspect of any one of (1) through (3) above, in a case where the object extraction device is unable to determine that the object, which has been determined as being the moving target by the moving target determination device, is the specific object, the failure-determination device may determine that the image capturing device is in the abnormal state in a case where an illumination device illuminates the predetermined region in the surroundings of the vehicle before determining that the image capturing device is in the abnormal state, and the object extraction device is still unable to determine that the object is the specific object even if illuminated by the illumination device.

Advantageous Effect of Invention

According to the aspect of (1) above, when an object detected by the transmitting and receiving device is a moving target, the likelihood of this object being a specific object is high. As such, after the transmitting and receiving device has detected an object for which the likelihood of being a previously specified object (such as pedestrian and vehicle) is high, it is determined whether the image capturing device can perform determination of whether the object is the specific object. As a result, an abnormal state (that is, failure) of the image capturing device can be determined at an early stage.

In the case of (2) above, in the case where the moving speed is low even when the moving target determination device has detected the object as being a moving target, it is difficult to isolate it from noise and stationary objects, and it is difficult to reliably determine that the object detected by the transmitting and receiving device is a moving target. Therefore, false determination can be prevented by making it so that the lower the moving speed, the less likely the image capturing device will be determined as being in an abnormal state.

In the case of (3) above, if the reflection level of the reflected wave from the object is low even when the moving target determination device has detected the object as being a moving target, it is difficult to isolate it from noise and stationary objects, and it is difficult to reliably determine that the object detected by the transmitting and receiving device is a moving target. Therefore, false determination can be prevented by making it so that the lower the reflection level, the less likely the image capturing device will be determined as being in an abnormal state.

In the case of (4) above, the specific object is extracted from the image of the image capturing device upon illuminating it with the illumination device, and the failure-determination device determines an abnormal state of the image capturing device. Therefore, it is possible to prevent the image capturing device from being determined as being an abnormal state in those cases such as traveling at night and traveling in a tunnel, where darkness of the surrounding environment causes it to become impossible to determine whether it is a specific object.

DESCRIPTION OF EMBODIMENTS

Hereunder, embodiments of a failure-determination apparatus of the present invention are described, with reference to the figures of FIG. 1 through FIG. 7.

Figure 1:
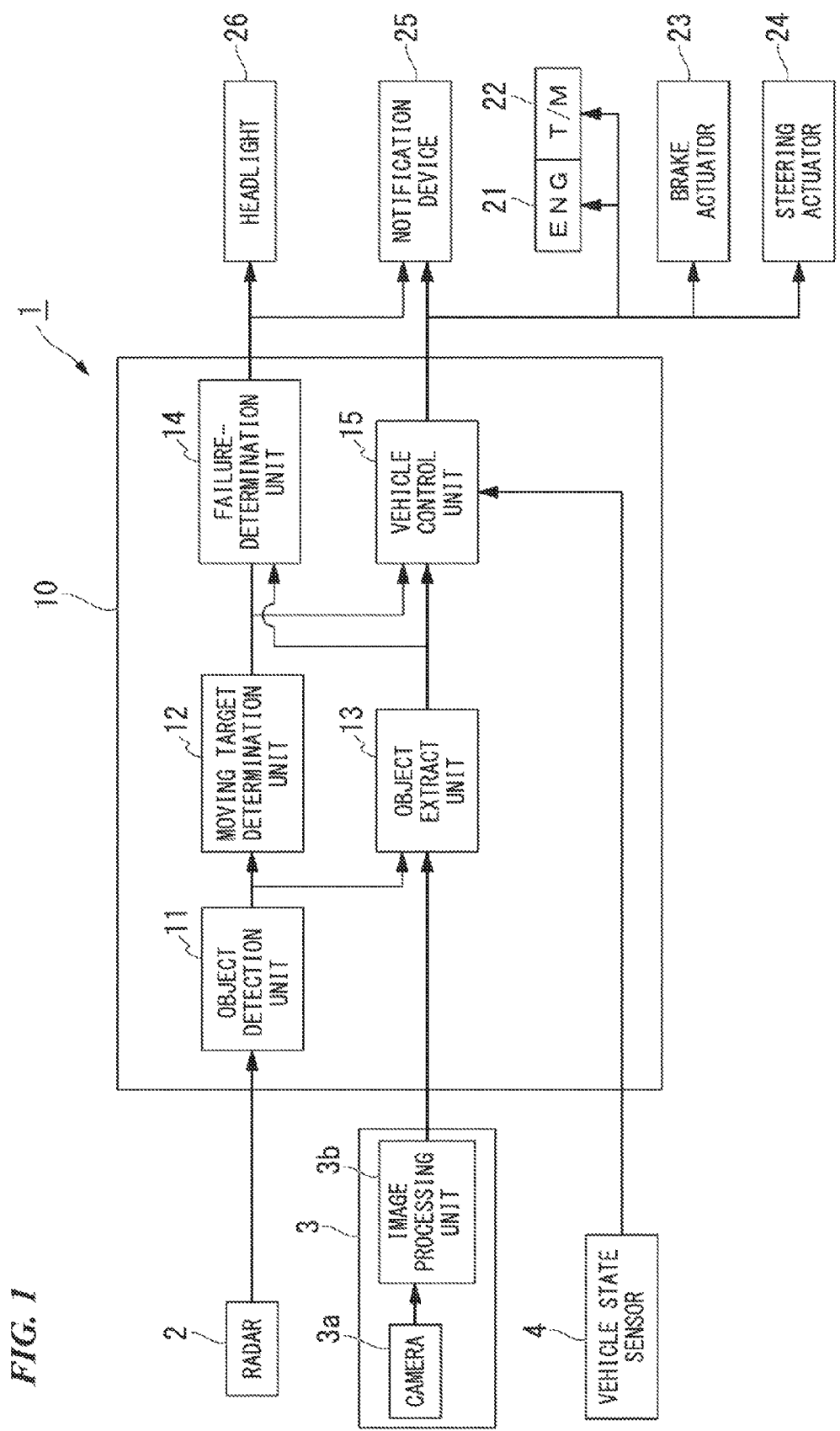
FIG. 1 is a block diagram of an object recognition apparatus that is provided with a failure-determination apparatus of a first embodiment of the present invention.

As shown in FIG. 1, the failure-determination apparatus of the first embodiment of the present invention is incorporated in an object recognition apparatus 1. The object recognition apparatus 1 is mounted for example on a vehicle that travels by transmitting the driving force of an internal combustion engine 21 as a driving source to the driving wheels of the vehicle through a transmission (T/M) 22 such as automatic transmission (AT) or a continuously variable transmission (CVT). In addition to the object recognition apparatus 1, the vehicle is provided with a brake actuator 23, a steering actuator 24, a notification device 25, and a headlight 26.

The object recognition apparatus 1 is provided with a radar device (transmitting and receiving device) 2, a camera unit (image capturing device) 3, a vehicle state sensor 4, and an electronic control device 10.

The radar device 2 transmits an electromagnetic wave such as a laser light or a millimeter wave toward the vehicle front side in the traveling direction, and receives a reflected wave caused when this transmitted electromagnetic wave is reflected from an object (for example, a structure, a pedestrian, and another vehicle) outside the vehicle, and it then combines the transmitted electromagnetic wave and the received electromagnetic wave (fleeted wave) to generate a beat signal, and outputs it to the electronic control device 10.

The camera unit 3 includes a camera 3a that comprises a CCD camera, a CMOS camera, or the like, and an image processing unit 3b. The image processing unit 3b performs predetermined image processing such as a filtering process and a binarizing process on an image external to the vehicle front side in the traveling direction obtained by the camera 3a, and generates image data including two dimensionally arrayed pixels, and outputs it to the electronic control device 10.

The vehicle state sensor 4 includes sensors for vehicle information of the vehicle such as: a vehicle speed sensor that detects speed (vehicle speed) of the vehicle; a yaw rate sensor that detects yaw rate (turning angle velocity about the vertical axis of the vehicle center of gravity); a steering angle sensor that detects steering angle (direction and magnitude of the steering angle input by the driver) and actual steering angle (turning angle) according the steering angle; a steering torque sensor that detects steering torque; a position sensor that detects the current position and traveling direction of the vehicle based on positioning signals such as GPS (global positioning system) signals for measuring vehicle position using artificial satellites as well as position signals transmitted from information transmission devices outside the vehicle, and also on detection results from an appropriate gyro sensor and an acceleration sensor; a sensor that detects accelerator pedal depression amount; and a sensor that detects brake pedal depression state. The vehicle state sensor 4 outputs vehicle information signals according to the detected information, to the electronic control device 10.

The electronic control device 10 is provided with an object detection unit 11, a moving target determination unit (moving target determination device) 12, an object extraction unit (object extraction device) 13, a failure-determination unit (failure-determination device) 14, and a vehicle control unit 15.

The object detection unit 11 calculates the position, speed, and reflection level of the object that reflected the electromagnetic wave, based on the beat signal input from the radar device 2, and outputs these calculated pieces of information to the moving target determination unit 12. The speed of an object can be calculated from the relative speed of the vehicle, which is calculated based on the position information of the object detected by the radar device 2 using a time difference, and from the speed of the vehicle.

The moving target determination unit 12 determines whether this object is a moving object (moving target) or a non-moving object, that is, a stationary object (an object that is not a moving target) based on the speed of the object input from the object detection unit 11, and outputs the determination result to the failure-determination unit 14 and the vehicle control unit 15.

Moreover, the object detection unit 11 calculates a predicted position of the object after a predetermined period of time based on the calculated speed (or relative speed) of the object, and outputs this predicted position information to the object extraction unit 13.

The object extraction unit 13 receives an input of image data from the camera unit 3, and receives an input of the predicted position information of the object from the object detection unit 11. The object extraction unit 13 sets on the image data input from the camera unit 3, a region of a predetermined size (hereunder, referred to as an integrated range), the center of which is for example the predicted position, based on the input predicted position information.

Furthermore, the object extraction unit 13 extracts an object on the image data by means of edge extraction based on brightness values of pixels included in the set integrated range, and performs a pattern-matching process on the extracted object, using a preliminarily stored model image of a human body or vehicle, to determine whether or not the extracted object matches to the human body or vehicle model image. Then the object extraction unit 13 outputs the determination result to the failure-determination unit 14 and the vehicle control unit 15.

The failure-determination unit 14 determines whether or not the camera unit 3 is in an abnormal state based on: the determination result input from the moving target determination unit 12, that is, the determination result of whether it is a moving target or a stationary object, and the determination result input from the object extraction unit 13, that is, the determination result of whether or not the object extracted on the image data matches to the human body or vehicle model image. In this first embodiment, a "specific object" refers to a pedestrian or a vehicle.

Moreover, the failure-determination unit 14, in a case where the camera unit 3 is determined as being in an abnormal state, outputs a camera failure signal to the notification device 25, and notifies the user of the abnormality of the object recognition apparatus 1 or the abnormality of the camera unit 3 via the notification device 25.

The vehicle control unit 15 determines whether or not the detected object is a pedestrian or a vehicle based on: the determination result input from the moving target determination unit 12, that is, the determination result of whether it is a moving target or a stationary object; and the determination result input from the object extraction unit 13, that is, the determination result of whether or not the object extracted on the image data matches to any human body or vehicle model image, and the vehicle control unit 15 controls traveling of the vehicle according to the determination result.

For example, if the detected object is determined as being a pedestrian or a vehicle and there is a possibility that this object may come in contact with the vehicle, traveling of the vehicle is controlled so that contact is avoided. More specifically, the vehicle control unit 15 outputs at least any one of a control signal that controls the driving force of the internal combustion engine 21; a control signal that controls transmission operation of the transmission 22; a control signal that controls a deceleration operation performed by the brake actuator 23; and a control signal that controls a steering operation of a steering mechanism (not shown in the figure) of the vehicle performed by the steering actuator 24, and executes either deceleration control or steering control of the vehicle as a contact avoidance operation.

Moreover, the vehicle control unit 15 controls at least either one of output timing and output content of notification performed by the notification device 25, according to the degree of possibility of contact with the pedestrian or vehicle.

Next is described a failure-determination process of the camera unit 3 executed in the failure-determination unit 14.

In this object recognition apparatus 1, in a case where the radar device 2 detects the presence of an object, an integrated range is set on the image data obtained by the camera unit 3, based on a predicted position of the object, and a pattern-matching process is performed on an object extracted in this integrated range. If there is a match, the object is treated as either a pedestrian candidate or a vehicle candidate, and information for the object obtained by the radar device 2 (such as position information and forward and backward movement speed) and information obtained by the camera unit 3 (such as object type information and lateral movement speed) are integrated.

As can be understood from the above, the object recognition apparatus 1 is a system that recognizes whether or not the detected object is a pedestrian or vehicle based on the information obtained by the radar device 2 and the information obtained by the camera unit 3. Hence the recognition result of the object recognition device 1 is influenced when there is an abnormality in the camera unit 3. Therefore, if an abnormality occurs in the camera unit 3, the abnormal state needs to be detected and needs to be notified to the user at an early stage.

Consequently, in the failure-determination apparatus of this object recognition apparatus 1, in a case where a specific object (that is, a pedestrian or a vehicle) cannot be determined in the integrated range on the image data of the camera unit 3 despite a moving target having been detected by the radar device 2, the camera unit 3 is determined as being in an abnormal state. The abnormal state of the camera unit 3 includes for example contamination of the lens of the camera 3a, a case where the image capturing range of the camera 3a is displaced, and breakage of the signal line from the camera unit 3 to the electronic control device 10.

Here, the reason for limiting an object to be detected by the radar device 2 to a moving target is described. Even if an object is detected by the radar device 2, if this object is a stationary object such as power pole, then a non-moving target (that is, a stationary object) is not determined as being the specific object (that is, a pedestrian or vehicle) in the object recognition that is performed by the camera unit 3 either. Therefore, what this object is cannot be determined in the result. Consequently, if a stationary object is included in objects to be detected by the radar device 2, which is a piece of information for determining an abnormality in the camera unit 3, the camera unit will be falsely determined as being in an abnormal state in cases such as the one described above. In order to prevent this type of false determination, a stationary object is removed from objects to be detected by the radar device 2 when determining an abnormality in the camera unit 3.

Figure 2:
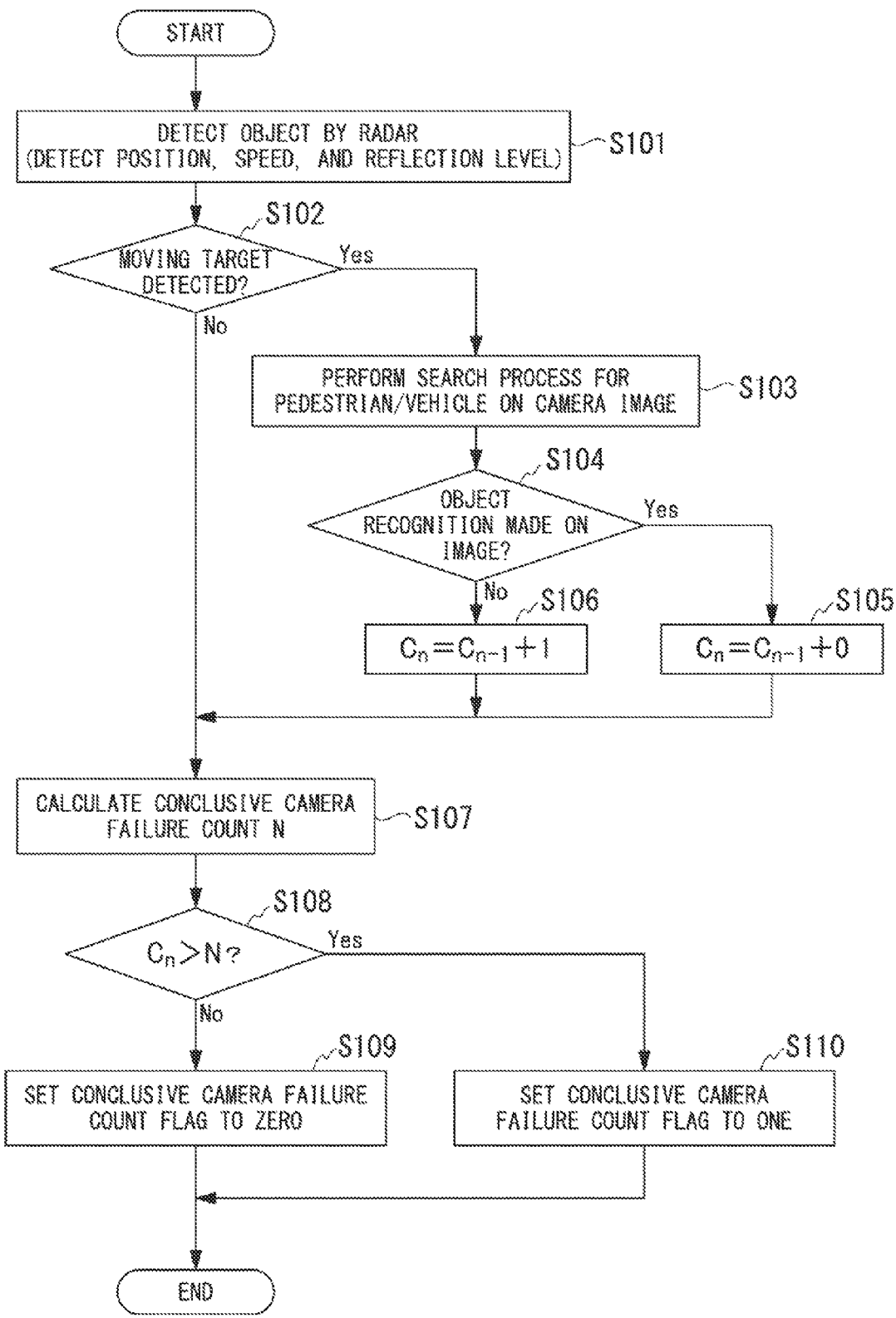
FIG. 2 is a flow chart showing a failure determination process in the failure-determination apparatus of the first embodiment.

Next, a failure-determination process of the camera unit 3 in this first embodiment is described, based on the flowchart of FIG. 2.

The failure-determination process routine shown in the flowchart of FIG. 2 is repeatedly executed at constant temporal intervals by the electronic control device 10.

First, in step S101, the radar device 2 detects an object that is present on the vehicle front side in the traveling direction and detects a reflection level of the reflected wave, and the device calculates the position and speed of this object.

Next, the process proceeds to step S102, and determines whether or not the detected object is a moving target, based on the speed of the object calculated in step S101.

Figure 3:
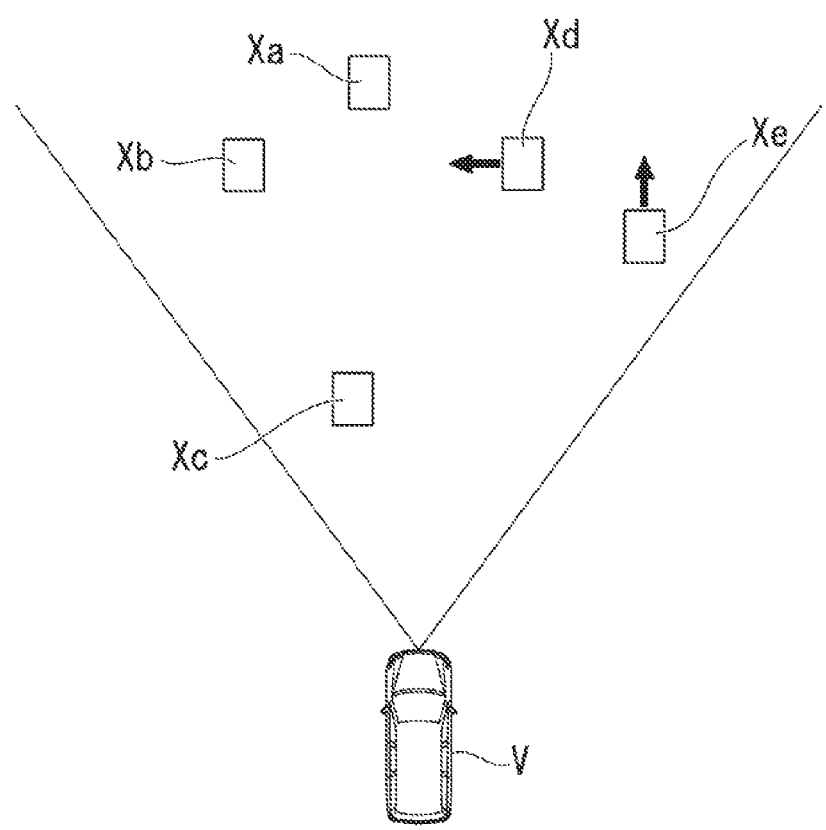
FIG. 3 is a diagram showing an object detection example performed by a radar device.

FIG. 3 is a diagram showing an example of object detection performed by the radar device 2. In the diagram, reference symbol V denotes the vehicle, and reference symbols Xa, Xb, Xc, Xd, and Xe each denotes an object detected by the radar device 2. In FIG. 3, the objects Xa, Xb, and Xc show objects that are determined as being stationary objects, and the objects Xd and Xe show objects that are determined as being moving targets. However, the radar device 2 cannot determine the identity of detected objects.

If the determination result in step S102 is "YES", the object detected by the radar device 2 is a moving target. Therefore the process proceeds to step S103 where object extraction is performed within the integrated range set on this image data, based on the image data of the camera unit 3.

Then, the process proceeds to step S104 and a pattern-matching process is performed on the object extracted in step S103, and whether or not it matches a preliminarily stored model image of a human or vehicle is determined.

If the determination result in step S104 is "YES", the process proceeds to step S105, and a value resulting from adding "0" to a previous definitive camera failure count value $C_{n-1}$ is updated as a current definitive camera failure count value $C_n(C_n=C_{n-1}+0)$. That is to say, if the determination result in step S104 is "YES", a moving target is detected by the radar device 2, and also this moving target can be determined as being a specific object (that is, a pedestrian or vehicle) in the integrated range on the image data of the camera unit 3. Therefore, the camera unit 3 can be determined as operating normally. Consequently, in this case, the value of the definitive camera failure count $C_n$ is not increased. The initial value of definitive camera failure count $C_n$ is made 0.

Figure 4A:
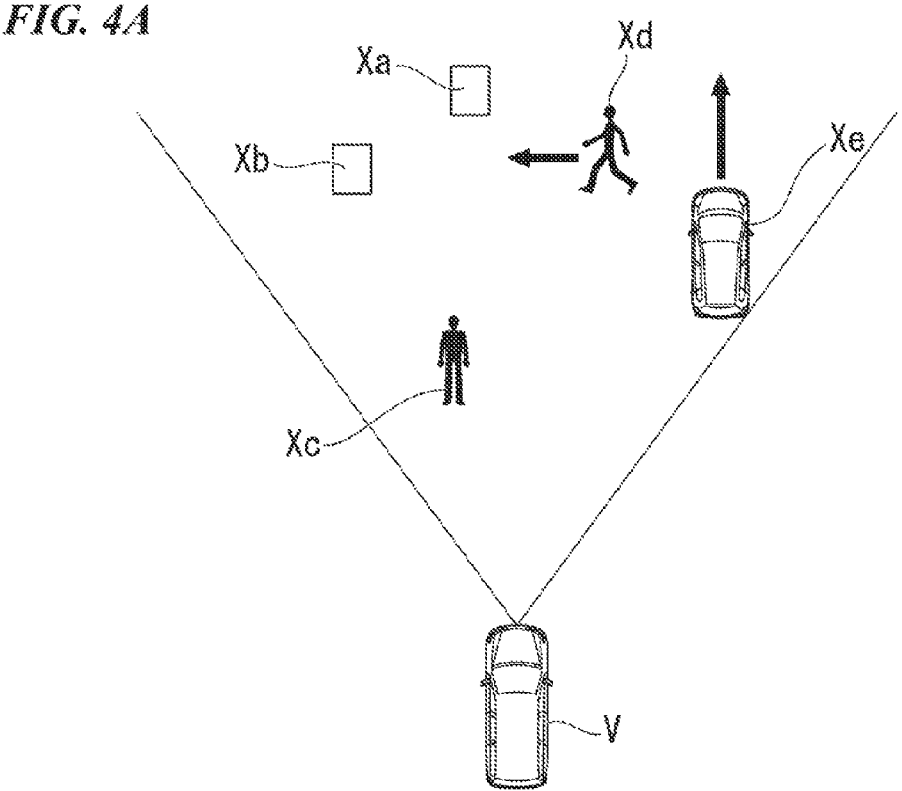
FIG. 4A is a diagram showing an object example performed by a camera unit (in a case where the camera unit is in a normal state).
Figure 4B:
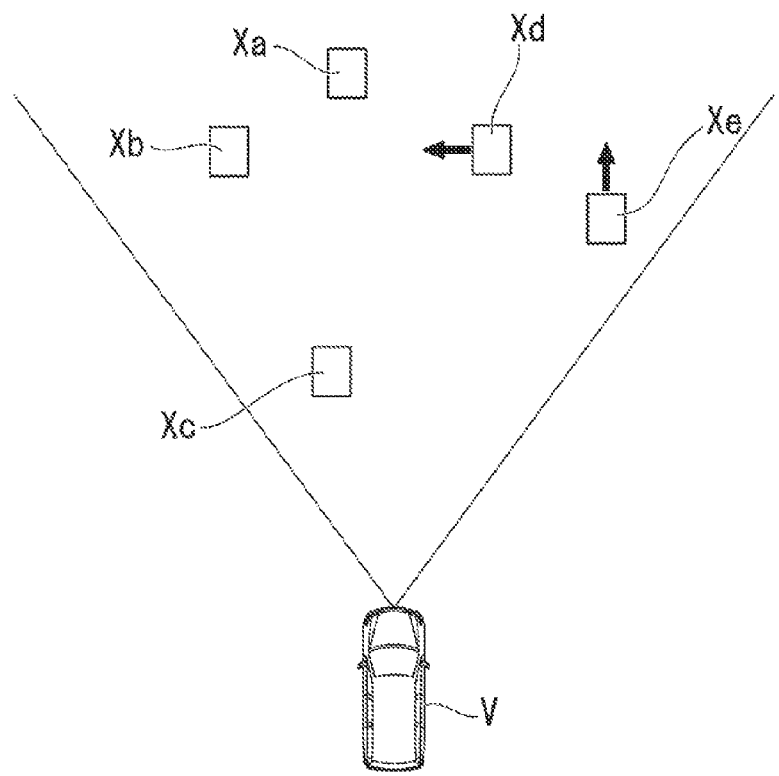
FIG. 4B is a diagram showing an object detection example performed by a camera unit (in a case where the camera unit is in an abnormal state).

FIG. 4A is a diagram showing an example of object detection performed by the camera unit 3 when the camera unit 3 is operating normally. This shows a case where an object is extracted in the integrated range for each object on the image data. This example shows a case where the objects Xa through Xe detected by the radar device 2 are detected also on the image data of the camera unit 3. In FIG. 4A and FIG. 4B, the objects Xc and Xd are objects that are determined as being pedestrians by the pattern-matching process, the object Xe is an object that is determined as being a vehicle by the pattern-matching process, and the objects Xa and Xb are objects that are determined as not being a pedestrian nor a vehicle by the pattern-matching process.

That is to say, FIG. 4A shows a case where the moving target Xd detected by the radar device 2 is determined as being a pedestrian by object detection of the camera unit 3, and the moving target Xe detected by the radar device 2 is determined as being a vehicle by object detection of the camera unit 3. In this case, the value of the definitive camera failure count $C_n$ is not increased. In FIG. 4A and FIG. 4B, reference symbol V denotes the vehicle itself.

On the other hand, if the determination result in step S104 is "NO", the process proceeds to step S106, and a value resulting from adding "1" to the previous definitive camera failure count value $C_{n-1}$ is updated as the current definitive camera failure count value $C_n(C_n=C_{n-1}+1)$. That is to say, if the determination result in step S104 is "NO", this moving target cannot be determined as being the specific object in the integrated range on the image data of the camera unit 3, despite the moving target having been detected by the radar device 2. Therefore, the possibility of the camera unit 3 being in an abnormal state is high. Consequently, in this case the value of the definitive camera failure count $C_n$ is increased by only "1".

FIG. 4B is a diagram showing an example of object detection performed by the camera unit 3 when the camera unit 3 is in an abnormal state. This example shows a case where an object is extracted in each integrated range for each object on the image data, however, none of the objects can be determined as being a human body or vehicle as a result of the pattern-matching process.

That is to say, FIG. 4B shows a case where the moving targets Xd and Xe detected by the radar device 2 cannot determined as being a pedestrian or vehicle by object detection of the camera unit 3. In this case, the definitive camera failure count is increased by "1".

The case where the moving targets Xd and Xe detected by the radar device 2 are not extracted as objects in the integrated range on the image data, is also included in those cases where the object cannot be determined as being a pedestrian or vehicle by object detection of the camera unit 3. Therefore, in this case also the definitive camera failure count is increased by "1".

Next, the process proceeds from step S105 and S106 to step S107, and a definitive camera failure count N is calculated. The definitive camera failure count N may be a fixed value not less than 1 (for example, an arbitrary integer such as "1", "5", and "10"). However, it may be changed according to the moving speed of the moving target and/or the intensity of the reflected wave reflected from the object during the object detection performed by the radar device 2 (that is, the reflection level).

In the case where the moving speed of the moving target detected by the radar device 2 is low, it is difficult to isolate it from noise and stationary objects, and it is difficult to reliably determine that the object detected by the radar device 2 is a moving target. Therefore, the lower the moving speed, the greater the definitive camera failure count N is set to thereby make determination of an abnormality in the camera unit 3 less likely. Thereby, false determination of an abnormality in the camera is prevented.

Figure 5:
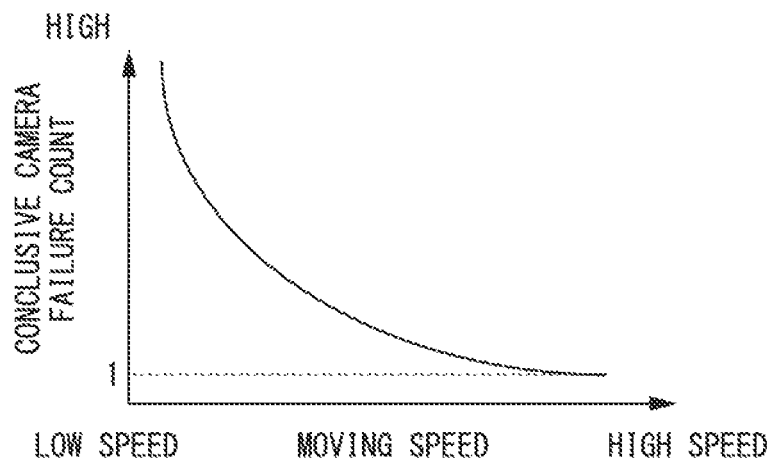
FIG. 5 is a diagram showing an example of a definitive count calculation table for calculating a definitive camera failure count according to the moving speed of an object.

FIG. 5 is an example of a definitive count calculation table for calculating a definitive camera failure count N according to the moving speed of a moving target. In this example, the definitive camera failure count N is set to "1" when the moving speed is greater than or equal to a predetermined value, and the lower the moving speed compared to the predetermined value, the greater the value to which the definitive camera failure count N is set.

Similarly for reflection level, in the case where the reflection level is low in object detection performed by the radar device 2, it is difficult to isolate it from noise and stationary objects, and it is difficult to reliably determine that the object detected by the radar device 2 is a moving target. Therefore, the lower the reflection level, the greater the definitive camera failure count N is set, to thereby make determination of an abnormality in the camera unit 3 less likely. Thereby, false determination of an abnormality in the camera is prevented.

Figure 6:
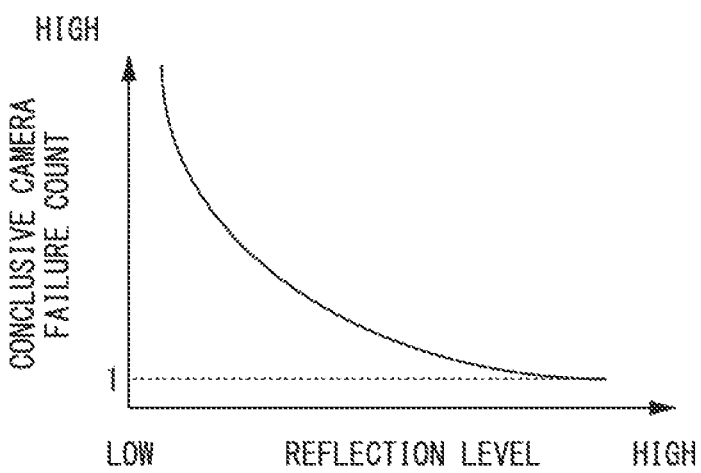
FIG. 6 is a diagram showing an example of a definitive count calculation table for calculating a definitive camera failure count according to the reflection level of an object.

FIG. 6 is an example of a definitive count calculation table for calculating a definitive camera failure count N according to size of the reflection level. In this example, the definitive camera failure count N is set to "1" when the reflection level is greater than or equal to a predetermined value, and the lower the reflection level compared to the predetermined value, the greater the value to which the definitive camera failure count N is set.

Moreover, in the case of calculating the definitive camera failure count N according to both the moving speed and the reflection level, the definitive camera failure count for when the moving speed and the reflection level take preliminarily set reference values is set as a reference count $N_0$ first, and when the vertical axises of the tables shown in FIG. 5 and FIG. 6 are made coefficients k1 and k2 (not less than 1), the coefficient k1 according to the moving speed and the coefficient k2 according to the reflection level are found by making reference to each table. The definitive camera failure count N can be calculated by multiplying the reference count $N_0$ by these coefficients. ($N=N_0*k1*k2$).

Next, the process proceeds from step S107 to step S108, and it is determined whether or not the current definitive camera failure count value $C_n$ exceeds the definitive camera failure count N.

If the determination result of step S108 is "NO" ($C_n \leq N$), the process proceeds to step S109, and the conclusive camera failure flag is made "0".

On the other hand, if the determination result of step S108 is "YES" ($C_n > N$), the process proceeds to step S110, and the conclusive camera failure flag is made "1", and execution of this routine is ended for the meantime. Thereby, the camera unit 3 is concluded as being in an abnormal state.

This failure-determination process is repeatedly executed for each object detected by the radar device 2 and is simultaneously executed in parallel for each object, with the sequence of steps S101 through S110 above treated as one cycle. In the case where the radar device 2 detects a plurality of moving targets, if the definitive camera failure count $C_n$ exceeds the definitive camera failure count N in the failure-determination process performed at least on any one of the moving targets, the camera unit 3 is concluded as being in an abnormal state.

Alternatively, in the case where the radar device 2 detects a plurality of moving targets, if definitive camera failure counts $C_n$ calculated for the respective moving targets are summed, and the total count of the summed definitive camera failure counts $C_n$ exceeds the definitive camera failure count N, the camera unit 3 may be concluded as being in an abnormal state.

According to the failure-determination apparatus of this first embodiment, in the case where the object detected by the radar device 2 is a moving target, the fact that this object has a high possibility of being a pedestrian or vehicle is used, and upon preliminarily detecting a moving target that is highly likely to be a pedestrian or vehicle by the radar device 2, the camera unit 3 determines whether the detected object is a pedestrian or a vehicle. Therefore, the camera unit 3 can be determined as being in a normal state if the camera unit 3 successfully determines it as a pedestrian or vehicle, and the camera unit 3 can be determined as being in an abnormal state if the camera unit 3 fails to determine it as a pedestrian or vehicle. Therefore, an abnormal state of the camera unit 3 can be determined at an early stage.

Moreover, the lower the moving speed of the moving target detected by the radar device 2, or the lower the reflection level, the greater the value to which the definitive camera failure count N is set. As a result, the lower the moving speed, or the lower the reflection level, the less likely the camera unit 3 can be determined as being in an abnormal state. Thereby, false determination can be prevented.

Next, failure-determination of the camera unit 3 in a failure-determination apparatus of a second embodiment of the present invention is described.

When the surrounding environment of the vehicle is dark such as in the case where the vehicle is traveling at night or traveling in a tunnel, it may be difficult to extract an object from image data of the camera unit 3, and the pattern-matching process may become difficult in some cases. In this type of case, a false determination may be made if an abnormality is determined in the camera unit 3 only because, despite a moving target having been detected by the radar device 2, this moving target has not been determined as being a pedestrian or vehicle in the integrated range on the image data of the camera unit 3.

In the failure-determination process in the failure-determination apparatus of the second embodiment, in order to prevent this type of false determination, in a case where, despite a moving target having been detected by the radar device 2, this moving target has not been determined as being a pedestrian or vehicle in the integrated range on the image data of the camera unit 3, rather than increasing the definitive camera failure count immediately, image data is generated based on an image captured again by the camera 3a upon turning on the headlight 26 of the vehicle and illuminating the vehicle front side in the traveling direction, and it is determined whether or not the moving target is a pedestrian or a vehicle in the integrated range on this image data. If the moving target still cannot be determined as a pedestrian or vehicle, then the definitive camera failure count is increased.

Figure 7:
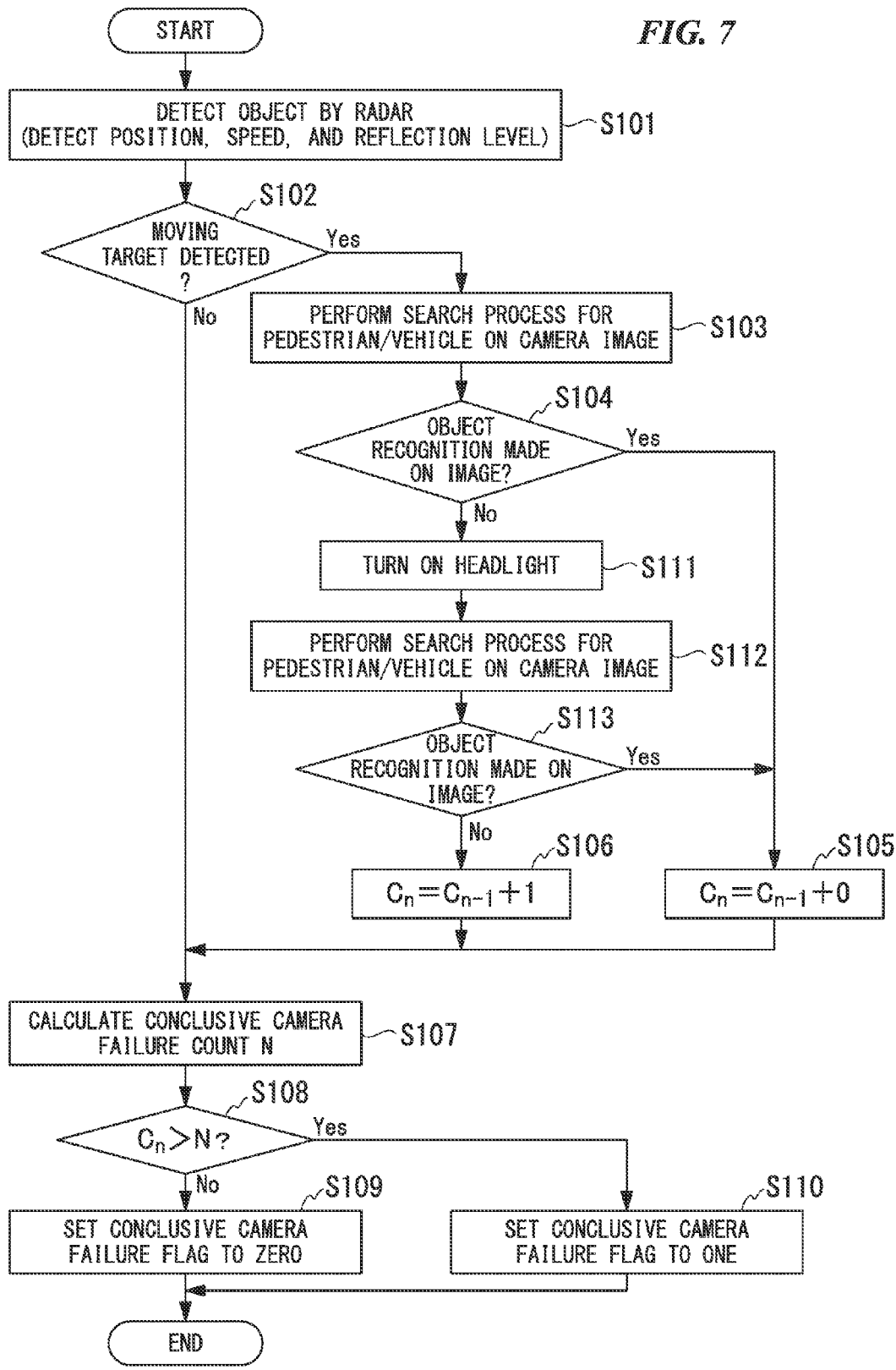
FIG. 7 is a flow chart showing a failure determination process in a failure-determination apparatus of a second embodiment of the present invention.

Hereunder, a failure-determination process of the second embodiment is described, based on the flowchart of FIG. 7.

Processes of steps S101 through S105 and steps S107 through S110 are the same as the processes with the same step numbers in the first embodiment, and the flows of these processes are also the same as those in the first embodiment. Therefore descriptions thereof are omitted.

If the determination result of step S104 is "NO", the process proceeds to step S111, and the headlight 26 is turned on.

Next, the process proceeds to step S112, and on image data that is generated based on the image captured by the camera 3a after turning on the headlight 26, there is performed object extraction within an integrated range set on this image data.

Then, the process proceeds to step S113 and a pattern-matching process is performed on the object extracted in step S112, and it is determined whether or not the extracted object matches a preliminarily stored model image of a human or vehicle.

If the determination result in step S113 is "YES", that is, in the case where the moving target can be determined as a pedestrian or vehicle, the process proceeds to step S105, and a value resulting from adding "0" to a previous definitive camera failure count value $C_{n-1}$ is updated as a current definitive camera failure count value $C_n$ ($C_n=C_{n-1}+0$).

If the determination result in step S113 is "NO", that is, in the case where the moving target cannot be determined as a pedestrian or vehicle, the process proceeds to step S106, and a value resulting from adding "1" to the previous definitive camera failure count value $C_{n-1}$ is updated as the current definitive camera failure count value $C_n$ ($C_n=C_{n-1}+1$).

Then, the process proceeds from steps S105 and S106 to step S107. Processes similar to those in the first embodiment are executed thereafter.

According to the failure-determination apparatus of this second embodiment, in addition to the action and effect of the failure-determination apparatus of the first embodiment described above, the camera 3a performs image capturing again upon turning on the headlight 26, and then it is determined whether the moving target is a pedestrian or a vehicle based on the image data. Therefore, it is possible to prevent the camera unit 3 from being falsely determined as being in an abnormal state in the case where determination of a pedestrian or a vehicle cannot be made because of the darkness of the surrounding environment, for example, when traveling at night or traveling in a tunnel.

Another Embodiment

The present invention is not limited to the embodiments described above.

For example, in the embodiments described above, when the radar device 2 detects a plurality of moving targets, the definitive camera failure count is calculated for each object detected by the radar device 2. However, if at least one moving target on single image data cannot be determined as a pedestrian or a vehicle, the definitive camera failure count may be increased by "1", and if the integrated value of this definitive camera failure count exceeds a definitive camera failure count N, the camera unit 3 may be determined as being in an abnormal state.

Moreover, in the embodiments described above, the specific objects are a pedestrian and/or a vehicle. However, animals such as a dog and a cat may be added to the specific objects.

The direction of object detection is not limited to the vehicle front side in the traveling direction, and it may be the lengthwise rear side of the vehicle or a side of the vehicle.

The control using an object that is determined as a specific object by the object recognition apparatus 1 in which the failure-determination apparatus is incorporated, is not limited to traveling control for avoiding contact between the vehicle and an object. Various types of control that may be performed by the vehicle with respect to the specific object are possible, such as tracking-traveling control for the vehicle to track and travel after another vehicle traveling ahead, where the specific object serves as this another vehicle traveling ahead.

The respective configurations and combination thereof in each embodiment are merely examples, and addition, omission, substitution, and other alterations may be made to the configurations without departing from the scope of the invention.

DESCRIPTION OF REFERENCE SYMBOLS

2 Radar device (transmitting and receiving device)
3 Camera unit (image capturing device)
12 Moving target determination unit (moving target determination device)
13 Object extraction unit (object extraction device)
14 Failure-determination unit (failure-determination device)
26 Headlight (illumination device)

The invention claimed is:

1. A failure-determination apparatus comprising: a transmitting and receiving device that transmits an electromagnetic wave toward a predetermined region in the surroundings of a vehicle, and that receives a reflected wave caused by the electromagnetic wave reflected from an object in the surroundings of the vehicle; an image capturing device that captures an image of the predetermined region in the surroundings of the vehicle; a moving target determination device that determines whether or not the object detected by the transmitting and receiving device is a moving target; an object extraction device that extracts a pedestrian or another vehicle from the image captured by the image capturing device; and a failure-determination device that determines that the image capturing device is in an abnormal state when the object which has been determined to be the moving target by the moving target determination device, cannot be determined to be the pedestrian or the another vehicle by the object extraction device, wherein the lower the moving speed of the object, which has been determined as being the moving target by the moving target determination device, the less likely it will be that the image capturing device will be determined as being in the abnormal state.

2. A failure-determination apparatus comprising: a transmitting and receiving device that transmits an electromagnetic wave toward a predetermined region in the surroundings of a vehicle, and that receives a reflected wave caused by the electromagnetic wave reflected from an object in the surroundings of the vehicle; an image capturing device that captures an image of the predetermined region in the surroundings of the vehicle; a moving target determination device that determines whether or not the object detected by the transmitting and receiving device is a moving target; an object extraction device that extracts a pedestrian or another vehicle from the image captured by the image capturing device; and a failure-determination device that determines that the image capturing device is in an abnormal state when the object which has been determined to be the moving target by the moving target determination device, cannot be determined to be the pedestrian or the another vehicle by the object extraction device, wherein the lower the reflection level of the reflected wave, which has been reflected from the object determined as being the moving target by the moving target determination device, the less likely it will be that the image capturing device will be determined as being in the abnormal state.

3. A failure-determination apparatus comprising: a transmitting and receiving device that transmits an electromagnetic wave toward a predetermined region in the surroundings of a vehicle, and that receives a reflected wave caused by the electromagnetic wave reflected from an object in the surroundings of the vehicle; an image capturing device that captures an image of the predetermined region in the surroundings of the vehicle; a moving target determination device that determines whether or not the object detected by the transmitting and receiving device is a moving target; an object extraction device that extracts a pedestrian or another vehicle from the image captured by the image capturing device; and a failure-determination device that determines that the image capturing device is in an abnormal state when the object which has been determined to be the moving target by the moving target determination device, cannot be determined to be the pedestrian or the another vehicle by the object extraction device, wherein, in a case where the object extraction device is unable to determine that the object, which has been determined as being the moving target by the moving target determination device, is the pedestrian or the another vehicle, the failure-determination device determines that the image capturing device is in the abnormal state in a case where an illumination device illuminates the predetermined region in the surroundings of the vehicle before determining that the image capturing device is in the abnormal state, and the object extraction device is still unable to determine that the object is the pedestrian or the another vehicle even if illuminated by the illumination device.

* * * * *